US006804374B1

(12) United States Patent  (10) Patent No.: US 6,804,374 B1
Beattie et al.  (45) Date of Patent: Oct. 12, 2004

(54) RELATING TO WATERMARKS

(75) Inventors: Robert Beattie, Edinburgh (GB); Anthony Richard Huggett, Eastleigh (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/600,678

(22) PCT Filed: Dec. 18, 1998

(86) PCT No.: PCT/EP98/08524

§ 371 (c)(1), (2), (4) Date: Jul. 20, 2000

(87) PCT Pub. No.: WO99/38318

PCT Pub. Date: Jul. 29, 1999

(30) Foreign Application Priority Data

Jan. 20, 1998 (GB) .............................. 9801131

(51) Int. Cl.$^7$ ................................................ G06K 9/00
(52) U.S. Cl. ..................................................... 382/100
(58) Field of Search ......................................... 382/100

(56) References Cited

U.S. PATENT DOCUMENTS

| | | | | |
|---|---|---|---|---|
| 5,848,155 A | * | 12/1998 | Cox ........................... | 382/191 |
| 5,859,920 A | * | 1/1999 | Daly et al. .................. | 382/115 |
| 5,915,027 A | * | 6/1999 | Cox et al. ...................... | 380/54 |
| 6,226,387 B1 | * | 5/2001 | Tewfik et al. ............... | 382/100 |
| 6,453,053 B1 | * | 9/2002 | Wakasu ....................... | 382/100 |
| 6,633,652 B1 | * | 10/2003 | Donescu ..................... | 382/100 |
| 6,633,653 B1 | * | 10/2003 | Hobson et al. .............. | 382/100 |

FOREIGN PATENT DOCUMENTS

| | | |
|---|---|---|
| EP | 0777197 | 6/1997 |
| EP | 0840513 | 5/1998 |
| EP | 0854633 | 7/1998 |

OTHER PUBLICATIONS

Russ, John C. "The Image Processing Handbook" 2nd edition. Boca Raton, FL. CRC Press, Inc., 1994. pp. 341–344.*

* cited by examiner

*Primary Examiner*—Leo Boudreau
*Assistant Examiner*—Hussein Akhavannik
(74) *Attorney, Agent, or Firm*—Douglas S. Rupert; Wildman, Harrold, Allen & Dixon LLP

(57) ABSTRACT

A method and apparatus detects the presence of a watermark in digital data. The digital data may represent picture or sound information and maybe in the form of a broadcast television signal or a signal that has been recorded on a recording medium such as a compact disc. The watermark includes coefficients which have been subject to an inverse local orthogonal transform before being embedded in the input data. In order to detect the presence of the watermark, the input watermarked data is first forward transformed and subtracted from the watermark coefficients so as to derive the data coefficients. The data coefficients are squared and formed into a local average to obtain a measure of the power in the local average. The watermark coefficients are divided by the local average so as to scale them and the scaled watermark coefficients are cross-correlated with the input data to detect whether the watermark is present. The cross-correlation is performed by means of a multiplier receiving the input data as a first input and the scaled watermark coefficients as a second input. The resulting output detection signal is subjected to a thresholding operation using a threshold set in dependence upon the global average power of the input data set.

22 Claims, 7 Drawing Sheets

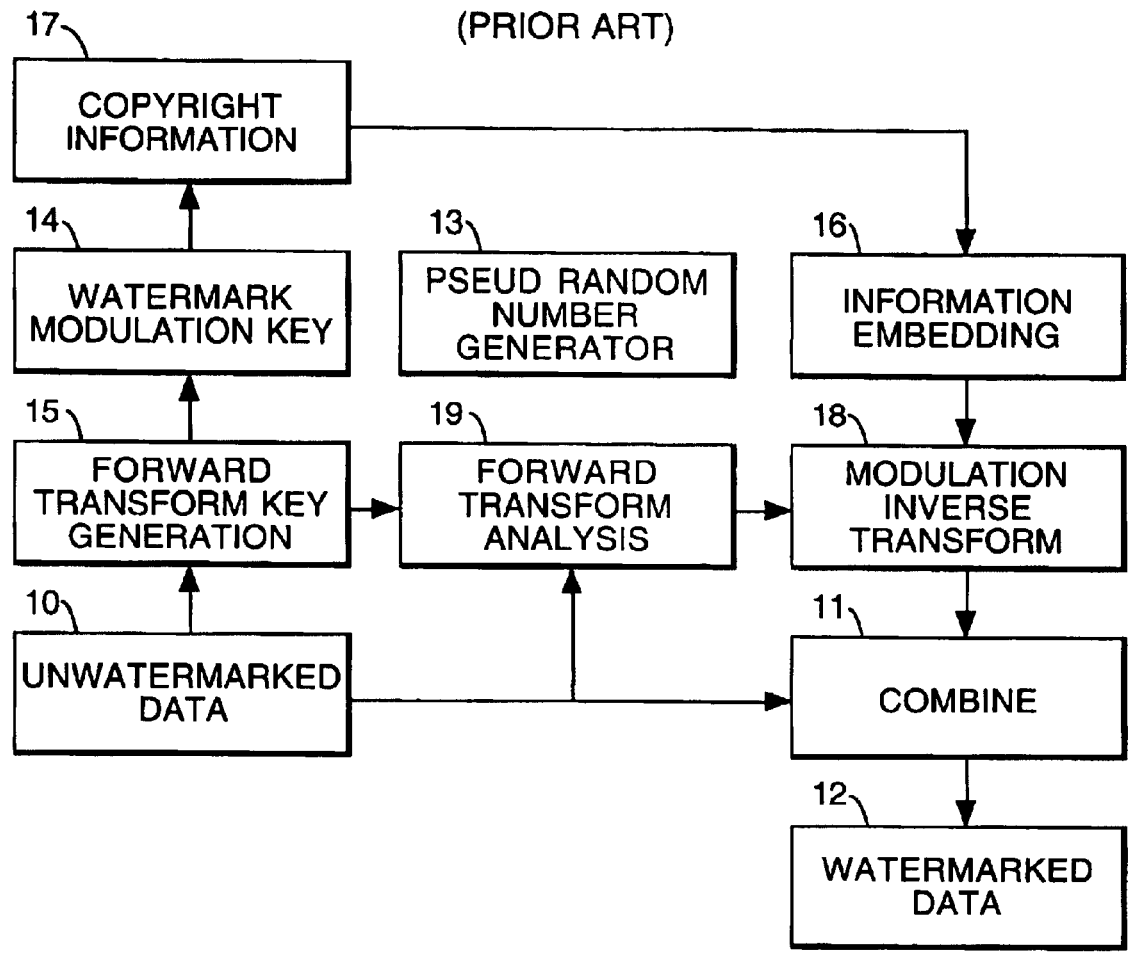

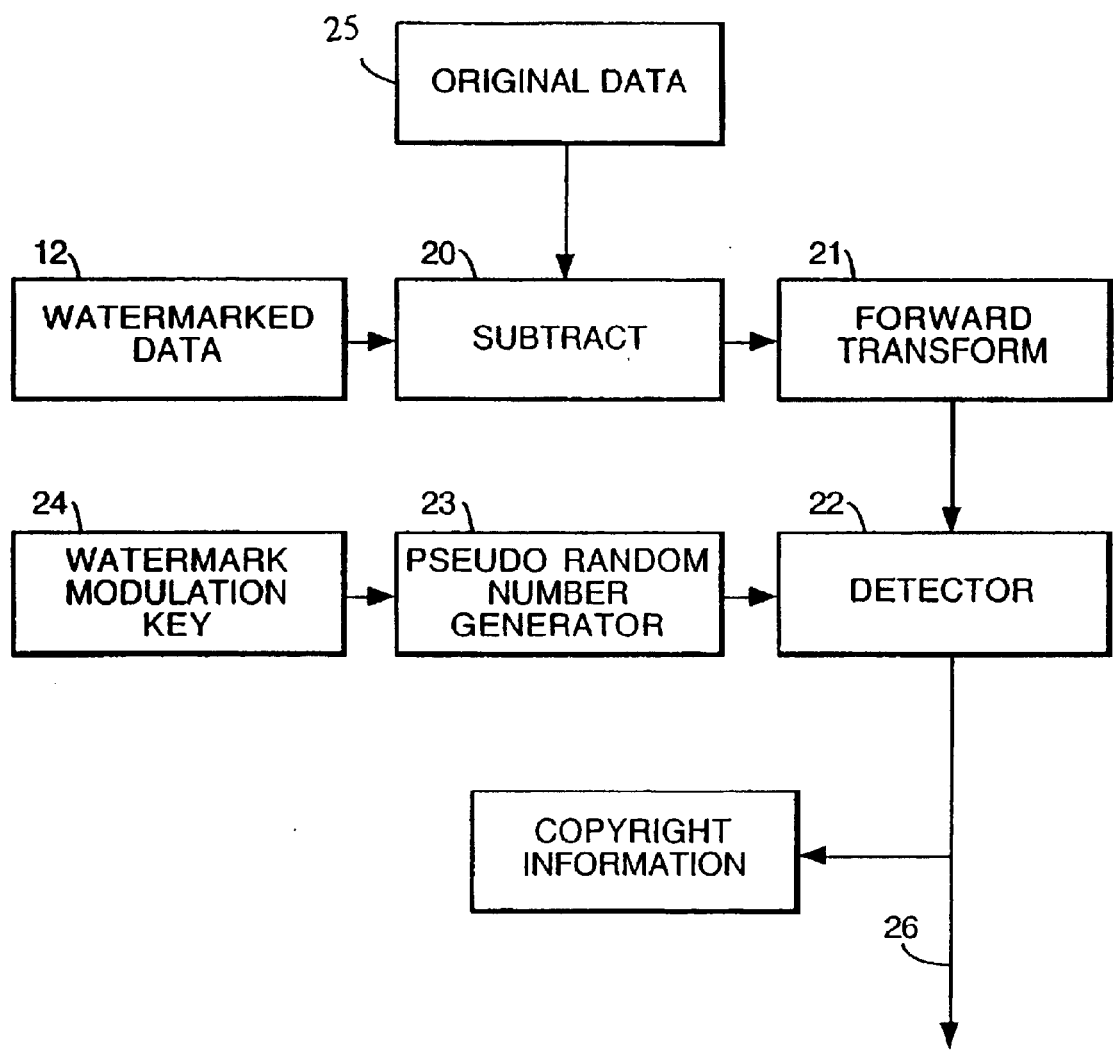

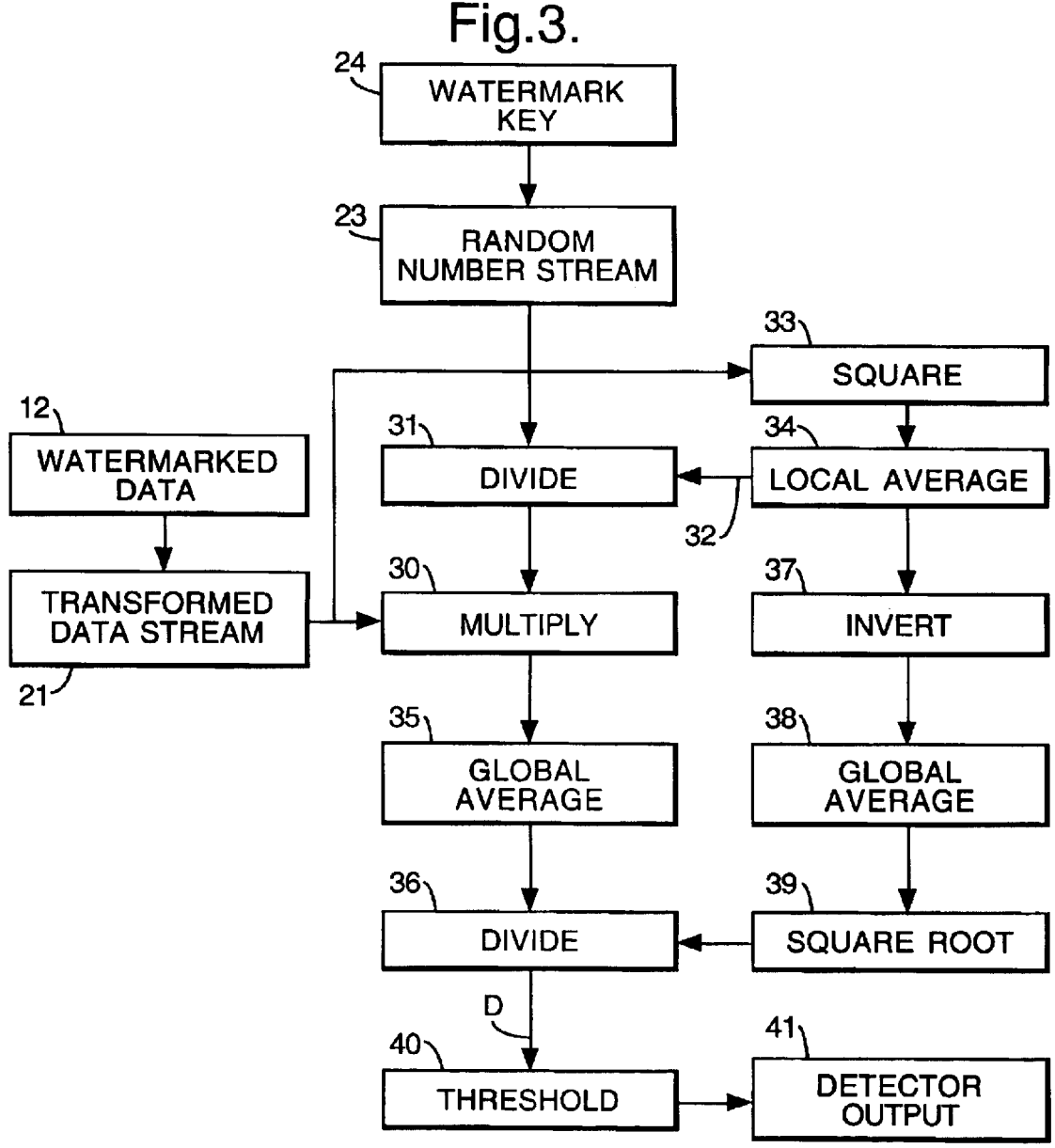

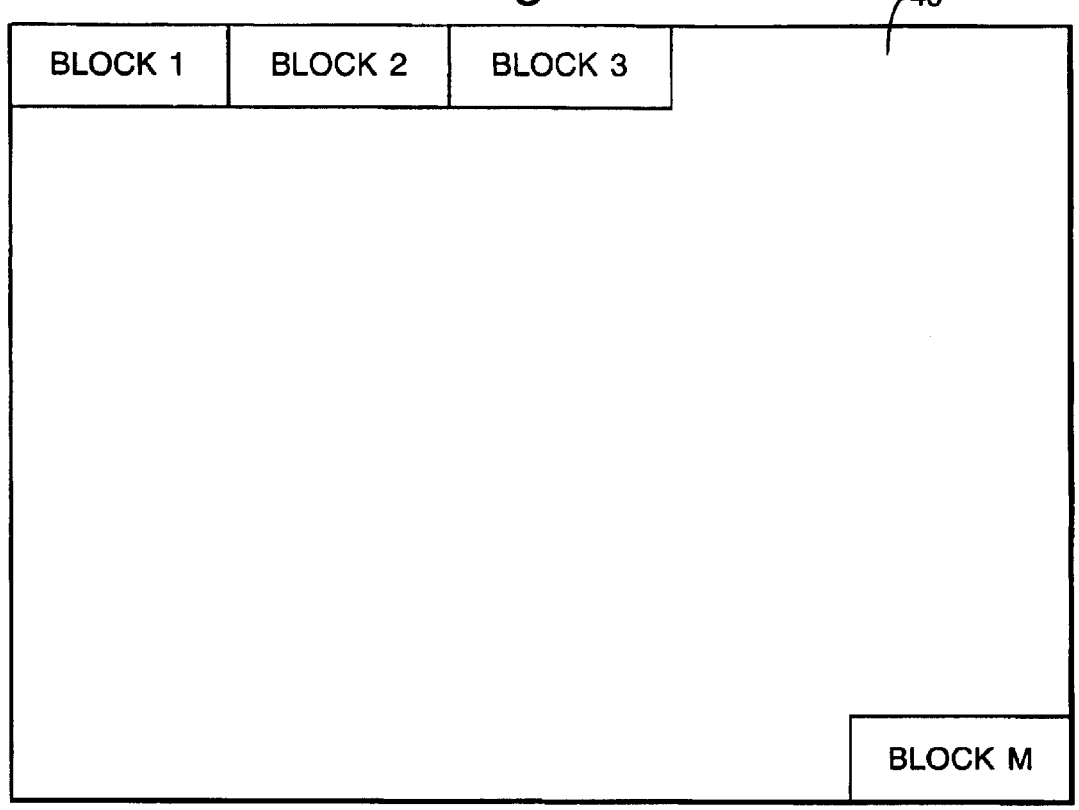

ORIGINAL IMAGE

WATERMARKED IMAGE

RELATING TO WATERMARKS

BACKGROUND OF THE INVENTION

1. Field of the Invention

The present invention relates to a method and apparatus for detecting a watermark. The invention has particular application to detecting a watermark in a digital picture or sound signal.

2. Description of the Related Art

Watermarking is a well known technique which is used to protect against the fraudulent copying or counterfeiting of documents or currency. The physical medium carrying the document or currency is marked with a distinctive and recognizable mark which is difficult to remove. In more recent time a need has arisen to protect digital signals representing picture information or audio information by means of a distinctive watermark. A watermark may be used to establish the true origin or ownership of the picture or audio information that is represented by the signals. It can be of particular benefit in the fields of digitally broadcast television signals and digitally recorded picture or sound signals.

The watermarking of documents or currency requires the watermark to be readily visible to assure the person examining the document or currency that the document or currency is genuine and has not been counterfeited. A physical technique of this sort is of course inapplicable to the protection of digital signals. Digital signals can be manipulated using digital techniques thus removing an existing watermark and possibly introducing a fresh watermark. The watermark for protecting a digital signal therefore should be obscured from an observer or listener of the information represented by the digital signal and should be difficult if not impossible to remove. The watermark should still be detectable by the originator of the watermark to determine if a signal is genuine.

In addition it is advantageous that the watermarking for digital signals be sufficiently robust so as to be capable of withstanding the compression and decompression common in digital broadcasting techniques while still reliably indicating that the signal has been watermarked.

Existing watermarking schemes use a technique in which a watermark is generated from a random number sequence and added to the original picture or sound information to form a watermarked signal in which the watermark is obscured. When it is desired to detect the presence of the watermark, the watermarked signal is correlated with the watermark to generate a correlation signal which reveals the watermark.

A problem with the existing technique is that the watermark which is revealed through the correlation may be difficult to perceive. This may be due in part to the introduction of noise into the watermarked signal and may also be due to the difficulty in distinguishing the watermark from the information represented by the signal.

BRIEF SUMMARY OF THE INVENTION

A need therefore exists to improve the correlation for detecting the watermark.

According to the present invention there is now provided a method of detecting the presence of a watermark in input digital data, the watermark including coefficients embedded in the data, the method comprising the steps of, transforming the data and applying the transformed data as a first input and the watermark coefficients as a second input to a cross correlator so as to generate an output detection signal, characterised in that the method further includes scaling the cross correlation by a predetermined characteristic of the data.

The invention has the advantage that the output detection signal is significantly less noisy than in a conventional detector.

Further according to the present invention, there is provided apparatus to detect the presence of a watermark in input digital data, the watermark including coefficients embedded in the input data, the apparatus comprising means to receive and transform the input data, a cross correlator having a first input to receive the transformed data and a second input to receive the watermark coefficients, the cross correlator being effective to generate an output detection signal, characterised in that scaling means are provided to scale the cross correlation by a predetermined characteristic of the data.

BRIEF DESCRIPTION OF THE DRAWINGS

The invention will now be described, by way of example, with reference to the accompanying drawings in which;

FIG. 1 shows a block diagram of a known apparatus for embedding a watermark into a signal to be protected by the watermark, FIG. 2 shows a block diagram of a known apparatus for detecting the presence of a watermark, and FIG. 3 shows details of apparatus according to the present invention for detecting the presence of a watermark in a watermarked signal input to the apparatus, FIGS. 4 and 5 show a method of generating watermarked coefficients in a video signals which is subject to a inverse DCT, FIG. 7 shows the location of watermarked coefficients which have been subject to a forward DCT.

DETAILED DESCRIPTION OF THE INVENTION

Figure 6:
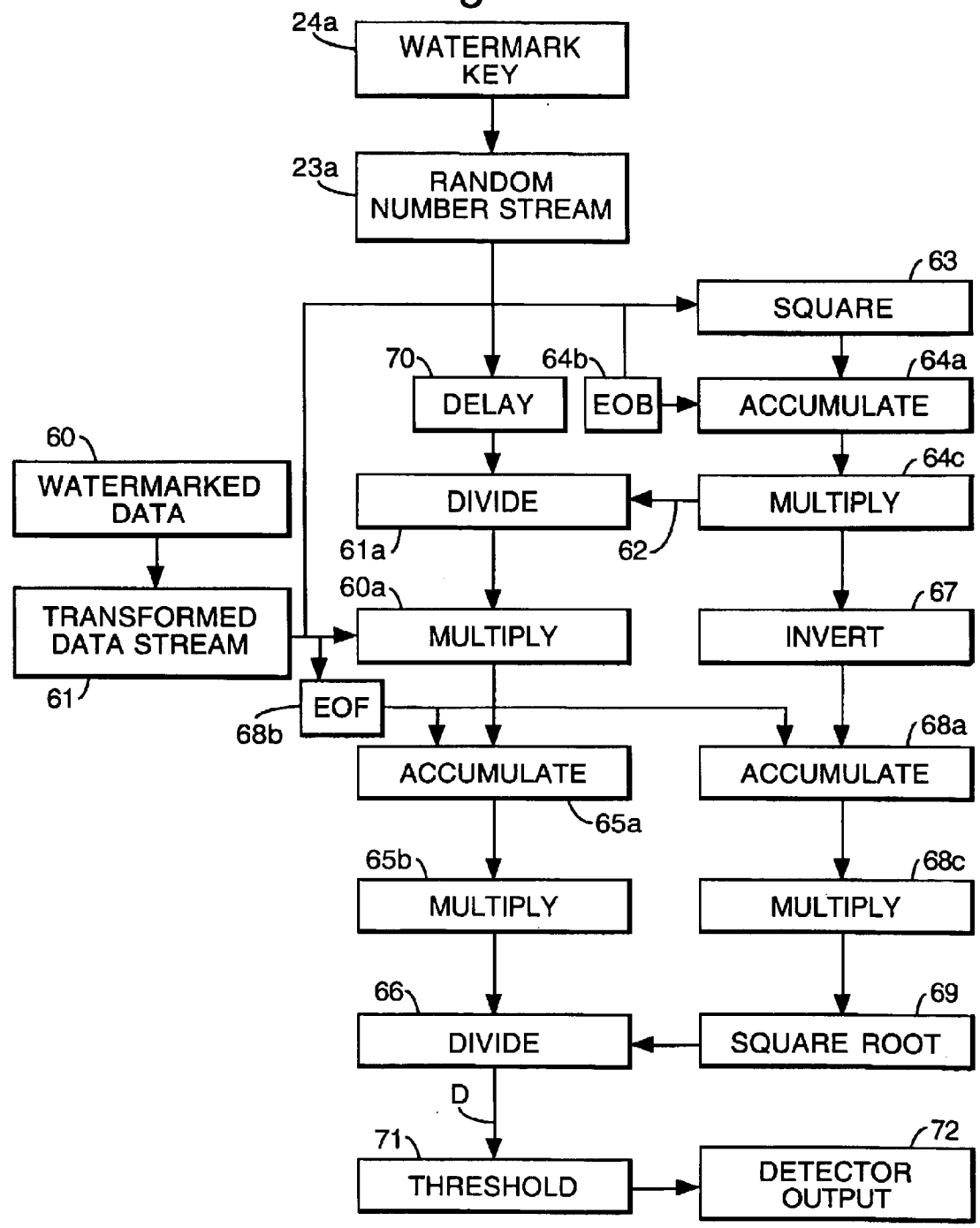
FIG. 6 shows a second apparatus according to the present invention for detecting the presence of a watermark in the watermarked coefficients of FIGS. 4 and 5.

FIG. 1 shows a source of unwatermarked data 10 which is intended to be combined with a watermark in a combining means 11 to generate watermarked data 12. The unwatermarked data 10 consists of a stream of digital data for example which represents picture or sound information and may constitute a video signal. The video signal may be a television broadcast signal or may be a video signal which is to be sent for recording on a recording medium such as a compact disc, laser disc, etc. In an alternative case, the unwatermarked data may be representative of sound information which is to be broadcast or to be recorded on a suitable recording medium such as a compact disc. The unwatermarked data is divided into a sequence of individual digital data sets or frames before being applied to the combining means 11. The watermark is applied to one or more of the digital data sets or frames. The watermark may be chosen to apply to a given succession of say five data sets or frames or may alternatively be applied to a known selection of individual data sets or frames.

The watermark consist of a series of watermark coefficients which are generated by means of a pseudo random number generator 13. The pseudo random number generator is a finite state machine which generates a long secure random sequence of numbers known only to the owner of the data. The pseudo random number generator 13 has an input to receive a watermark modulation key 15 which predetermines the initial state of the number generator 13 and therefore the coefficients that are generated by the number generator 13. The copyright information is embedded by means of the embedding device 16 into the random number stream from the number generator 13. The copyright information may be a text legend or graphical information or other.

The copyright information is embedded 13 by means of the embedding device 16 into the random number stream from the number generator 13. The copyright information may be a text legend or graphical information or other distinguishing information supplied from a copyright source 17. The embedded watermark coefficients are passed to a modulator 18 to be subjected to an inverse local orthogonal transform before being combined with the unwatermarked data in the combining means 11. The inverse transform may be chosen from a number of known such transforms including for example the inverse discrete cosine transform (DCT) which is well known in the field of compression of digital television signals. The purpose of the inverse transform is to spread the spectrum of the watermark. The result is to obscure the watermark when combined with the unwatermarked data.

The inverse transform applied to the watermark coefficients may be controlled by transform and analysis module 19 using the local data properties of the unwatermarked data. The data properties of the unwatermarked data are derived by a forward transform and analysis in the module 19.

It will be apparent to those skilled in the art that the source of copyright information may be omitted so that the watermark coefficients are applied directly from the number generator 13 to the modulator 18. Furthermore, the module 19 may be omitted so that the inverse transform applied to the watermark coefficients is not modified by the data properties of the unwatermarked data.

The inverse transform employed in the modulator 18 groups the random numbers appropriately to create the spectrum that is required. Low frequency terms are used in the inverse transformation because these withstand compression and decompression more robustly than higher frequency terms. Turning now to FIG. 2, there is shown a known method of detecting a watermark in the data that has been watermarked as described with reference to FIG. 1. The watermarked data 12 is applied in the known detection apparatus as one input to a subtractor 20. The subtractor 20 receives the original unwatermarked data 25 as another input and generates an output consisting of the inverse transform of the watermark coefficients.

Turning now to FIG. 2, there is shown a known method of detecting a watermark in the data that has been watermarked as described with reference to FIG. 1. The watermarked data 12 is applied in the known detection apparatus as one input to a subtractor 20. The subtractor 20 receives the original unwatermarked data 21 as another input and generates an output consisting of the inverse transform of the watermark coefficients. A forward transform of the result from the subtractor 20 is performed by a forward transform generator 21. In the case where the inverse transform is an DCT, the forward transform is the DCT. The result of the result of the forward transform is applied as one input to a detector 22.

The detector 22 has another input from a pseudo random number generator 23 which is of the same form and construction as the generator 13 of FIG. 1. The generator 23 receives a watermark modulation key 24 to correspond to the watermark modulation key 14 delivered to the generator 13. The detector 22 performs a cross correlation between the forward transform produced by the generator 21 with the coefficients generated by the generator 23 to produce an output detection signal 26. The output detection signal 26 may be taken as indicating the presence or absence of a watermark or may be interpreted to extract embedded copyright information.

Referring now to FIG. 3, a method and apparatus embodying the invention is shown for detecting the presence of the watermark in the watermarked data 12. The watermark data is first transformed by the forward transform generator 21 in the manner already described with reference to FIG. 2. The transformed data is applied as one input to a cross correlator including a multiplier 30 and a divider 31. The watermark coefficients are applied to another input to the detector by means of the pseudo random number generator 23. The generator 23 receives the watermark modulation key 24.

The transformed data coefficients are applied to a squarer 33 to form the square of the data coefficients from which the local average is formed in an averager 34. The result of the operations in the the squarer 33 and the averager 34 is to compute a local average 32 of the power of the data coefficients. These operations may be represented by the following equation:

$$\overline{F}_i^2 = \frac{1}{N_i} \sum_{j \in K_1} (G_j)^2 \qquad (1)$$

where $\overline{F}_i^2$ is the local average power in K samples of the data sequence, $K_i$ is the set of neighbours used in the computation, $N_i$ is the number of members in the set, $G_j$ are the set of transformed data coefficients.

The divider 31, divides the watermark coefficients by a scaling factor. This scaling factor is determined by the local average 32 of the power of the data coefficients. The divider output is applied to the multiplier 30. The multiplier then cross correlates the transformed data 21 with the divided watermark coefficients. This produces a detected correlation signal for the set of neighbours used in computing the local average power. The detected correlation signal is then applied to a global averaging means 35 to form a global average of the correlation signal for all the samples in the data sequence that makes up the set of data 21. The global average is passed to a further divider 36.

The local average computed in the averaging means 34 is applied to an inverter 37 to produce a local average inverse signal. This local average inverse signal is applied to a global averager 38 to form the global average for the set of data 21 of the inverse signals from the inverter 37.

The global average from the averager 38 is subject to a square root operation in the square root means 39 and then applied as a second input to the divider 36. The division in the divider 36 forms a result which is a detection signal D which can be represented by the following equation $$D = \frac{1}{\sqrt{B}} \sum_{i \in K} \frac{G_i W_i}{F_i^2}, \quad B = \sum_{i \in K} \frac{1}{F_i^2} \quad (2)$$

The detection signal D is finally subject to a thresholding operation in the threshold circuit 40 to produce a detector output signal 41.

The detection threshold T is set in the threshold circuit 40 such that the probability of the detection signal D being greater than T when the watermark is not present gives an acceptable maximum false alarm possibility of P where P is given by the following equation;

$$P = \frac{1}{\sqrt{2\pi}} \int_T^\infty \exp\left\{-\frac{D_2}{2}\right\} dD \quad (3)$$

It will be apparent from the block diagram of FIG. 3 that the cross correlation occurring in the multiplier 30 is performed using the watermarked coefficients which have been scaled by the scaling factor 32 determined by local average. The process of dividing the watermark coefficients by the scaling factor 32 reduces considerably the level of the noise occluding the estimate of the watermark amplitude.

The scaling factor may be applied to scale the input data instead of the watermark coefficients. This can be achieved by interposing the divider 31 between the transformed data stream 21 and the multiplier 30 instead of between the random number generator 23 and the multiplier 30. In yet another alternative, the scaling factor can be sued to scale the result of the cross correlation from the multiplier 30 instead of the watermark coefficients. In general, whichever alternative is chosen for the application of the scaling factor the result is to effect a scaling of the cross correlation performed by the multiplier 30.

The detection signal D is derived in the divider 36 from the global average supplied by the averager 35 and the square root operation performed by the square root module 39. The detection signal D has a Gaussian distribution when no watermark is present. The Gaussian distribution is such that the probability that the signal D would exceed the threshold T can be made extremely remote. A high degree of assurance is thereby provided of the detection of the watermark when the detection signal D exceeds the threshold T.

The apparatus shown in FIG. 3 may be applied to the detection of watermarks in video signals as will now be described with reference to FIGS. 4 to 11. The watermark coefficients are generated by first taking empty video frames and dividing each such frame into 16×16 small blocks. The number of blocks in each frame may be of a value other than 16×16 as will be apparent to those skilled in the art. FIG. 4 shows in diagrammatic form an empty video frame 40 and four of the blocks into which it is divided. The first three blocks are numbered 1 to 3 and the last block is M.

FIG. 5 shows one of the blocks in the frame 40. The block shown in FIG. 5 is representative of each of the blocks in the frame 40 and as shown is itself divided into a number of locations. In the specific example described here, there are 4×4 locations in each block. Some of the locations in the block are populated with watermark coefficients $W_1$ to $W_5$. The chosen locations are distributed in the upper left hand portion of each block.

The inverse DCT of each block is taken to construct the actual watermark. It will be seen from FIG. 5 that the population of watermark coefficients $W_1$ to $W_5$ correspond to the low frequency bases of the DCT and that the DC term is excluded. The process of constructing the inverse transform of the watermark coefficients is repeated for all the blocks of a frame so as to construct a complete watermark frame. The watermark frame is added to a video signal frame to produce a watermarked video frame. The same process is repeated for all the video frames which it is desired to mark in a sequence of frames in a video signal. The apparatus in FIG. 6 is adapted to receive the frames of the video signal which have been watermarked as described with reference to FIGS. 4 and 5. The received video signal 60 is transformed by the forward transform generator 61. The forward transform generator devides each video frame into the same pattern of blocks as before (in the specific example 16×16 blocks) and takes the forward DCT transformation of each block. The result is to reverse the inverse transformation described with reference to FIGS. 4 and 5.

Following the DCT the watermark image is now represented as a number of blocks of coefficients. Those coefficients within each block into which it is known that no watermark was embedded are discarded, leaving the potentially watermarked DCT coefficients G1 to G5 as shown in FIG. 7. These remaining coefficients are supplied by the forward transform generator 61 as one input to the cross correlator comprising a multiplier 60*a* and a divider 61*a*. The 5 watermarked coefficients in each block are presented as 6 neighbouring data samples.

The unmarked video coefficients in each block are discarded resulting in the five marked coefficient locations $G_1$ to $G_5$ in each block as shown in FIG. 7. The marked coefficients are supplied by the forward transform generator 61 as one input to the cross correlator comprising a multiplier 60*a* and a divider 61*a*. The 5 marked data coefficients in each block are presented as 5 neighbouring data samples.

It will be apparent to those skilled in the art that the number of data samples in each block is a matter of design choice and may be equal to a value other than 5. In general the number of data samples in each block presented to the cross correlator is K samples. The data samples presented by the forward transform generator 61 takes the form;

$$\{\{G_1^1 G_2^1 \ldots G_K^1\}, \{G_1^2 G_2^2 \ldots G_K^2\}, \ldots, \{G_1^M G_2^M \ldots G_K^M\}\}$$

where $G_i^j$ is the ith sample from the block j. The total number N of the samples is K*M=N.

The watermark coefficients are applied to another input to the detector of FIG. 6 by means of the pseudo random number generator 23*a* which receives the watermark key 24*a*.

The watermark coefficients W from the generator 23*a* are ordered in the same manner as the transformed data coefficients and appear in the form;

$$\{\{W_1^1 W_2^1 \ldots W_K^1\}, \{W_1^2 W_2^2 \ldots W_K^2\}, \ldots, \{W_1^M W_2^M \ldots W_K^M\}\}$$

The marked data coefficients from the generator 61 are fed into the cross correlator of FIG. 6 in synchronism with the generation of the watermark coefficients by the generator 23*a*. The marked data coefficients are supplied to a squarer 63 where they are squared before being supplied to an accumulator 64*a*. The end of each block of marked coefficients is detected by a detector 64*b* which latches the accumulator 64*a* to cause the accumulated value of the marked data coefficients to be passed to a multiplier 64*c*. The multiplier 64*c* multiplies the accumulated value by 1/N thereby to derive the local average 62 of the power of the marked data coefficients in each block.

The watermark coefficients from the generator 23*a* pass through a delay device 70 to the divider 61*a*. The delay device 70 imposes a delay on the incoming watermark coefficients to compensate for the delay in processing the marked data coefficients through the squarer 63, the accumulator 64a and the multiplier 64c. The divider 61a thus receives the local average from the multiplier 64c in synchronism with the watermark coefficients from the delay device 70. The divider 61a scales the watermark coefficients of each block by the scaling quantity 62 which is the local average power for the marked data coefficients in the same block. The scaling quantity is clipped by a clip circuit 62C before application to the divider 61a. The watermark coefficients are scaled, before application to the multiplier 60a to enhance the quality of the watermark amplitude estimate.

It will be apparent that the divider may be interposed between the data stream 61 and the multiplier 60a instead of between the delay device 70 and the multiplier 60a. In this case the scaling quantity 62 would be employed to scale the data stream 61 instead of the watermark coefficients. In yet another alternative, the scaling quantity 62 may be used to scale the output from the multiplier 60a.

The local average for each block generated by the multiplier 64c is applied to an inverter 67 to produce a local average inverse signal. The local average inverse signal from the inverter 67 is applied to an accumulator 68a which accumulates successive inverse local averages. The end of each video frame signal is detected by an end of frame detector 68b which supplies an end of frame signal to the accumulator 68a. The end of frame signal latches the accumulator 68a to pass the accumulated inverse local average values therein to a multiplier 68c. The multiplier multiplies the output from the accumulator 68a by 1/N thereby to derive a global average over each frame of the power of the marked data coefficients. A square root module 69 generates the square root of the global average from the multiplier 68.

The cross correlation performed by the multiplier 60a results in a cross correlation signal representing the correlation between the watermark coefficients and the marked data coefficients for each block in each frame of the video signal data. The cross correlation signals are passed to an accumulator 65a where the cross correlation signals are accumulated. The end of frame signal from the detector 68b latches the accumulator 65a and causes the accumulator to pass the accumulated cross correlation signals to a multiplier 65b. The multiplier multiplies the accumulated cross correlation signals by 1/N to derive a global average for each video frame.

The global average of the cross correlation signals is divided by the output from the square root module 69 to produce an output detection signal D. The output detection signal D is subject to a thresholding operation by a threshold circuit 71 to produce a detector output signal 72.

Figure 8:
FIGS. 8 and 9 show two images of which one is original and unwatermarked and the other is watermarked.
Figure 9:

Referring now to FIGS. 8 and 9 there are shown two samples of a video image. FIG. 8 shows an original image which includes no watermarked coefficients. FIG. 9 shows the same image but modified to include watermarked coefficients. Whilst the two images resemble one another so closely that the watermark is obscured to a viewer, it is necessary that the detector of the watermark should be able to discriminate between the two images with a high degree of assurance that one contains a known watermark whilst the other does not.

Figure 10:
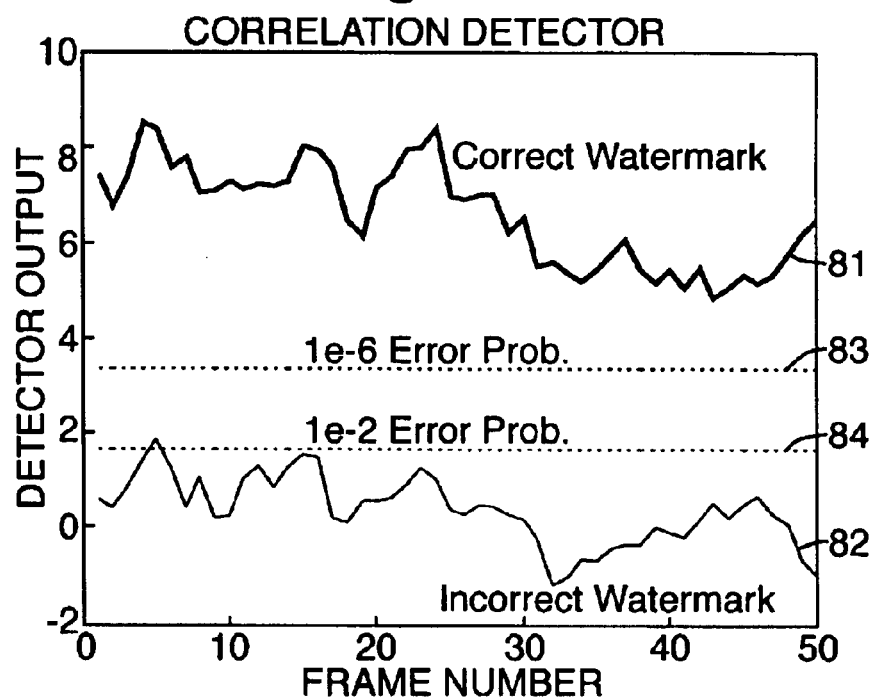
FIG. 10 is a graphical diagram of the correlation detected by the apparatus of FIG. 2 including a conventional detector.

FIG. 10 shows the response to be expected from a conventional detector. The detector output line 81 shows the detected correlation between the correct watermark coefficients and a watermarked video image such as that of FIG. 9. The detector output line 82 shows the detected correlation between a set of incorrect watermark coefficients and the watermarked image. Two possible threshold levels 83 and 84 are shown in FIG. 10 and it will be seen that the discrimination between a correct watermark and an incorrect watermark is relatively narrow. A threshold set at the level 84 would be unsatisfactory because there is the possibility of falsely detecting a watermark as shown where the line 82 exceeds the threshold 84. The threshold 83 is satisfactory but must be set carefully to avoid the possibility that the detector output line 81 does not drop below the threshold.

It is to be understood that modifications could be made and that all such modifications falling within the spirit and scope of the appended claims are intended to be included in the present invention.

A feature of the detector output lines 81 and 82 in FIG. 10 is that both deviate substantially from a median line. This is because of the relatively high noise levels associated with such a detector.

Figure 11:
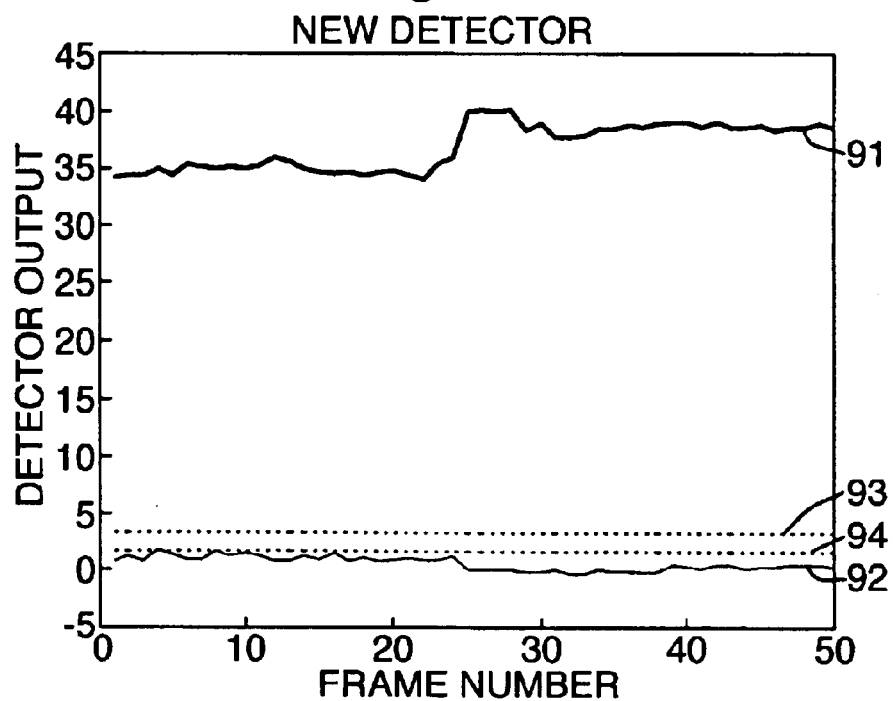
FIG. 11 is a graphical diagram of the correlation detected by the apparatus of FIG. 6.

Turning now to FIG. 11, there is shown the response from the detector of FIG. 6. The line 91 shows the detected correlation between the correct watermark coefficients and the marked data coefficients of a video image such as shown in FIG. 9. The line 92 shows the detected correlation between incorrect watermark coefficients and the video image. Two possible threshold levels are shown at lines 93 and 94. It will be observed that the detector outputs represented by the lines 91 and 92 show a wide discrimination between a correct and an incorrect watermark. The output in each case is also subject to much less deviation than the corresponding output shown in FIG. 10. As a consequence the threshold for the detection of a correct watermark can be set at a value which substantially removes uncertainty in detecting the watermark.

What is claimed is:

1. A method of detecting the presence of a watermark in digital data, the watermark including coefficients embedded in the data, the method comprising the steps of, spectrally transforming the data and applying the transformed data as a first input and the watermark coefficients as a second input to a cross correlator to provide a cross correlation, scaling the cross correlation by a local average characteristic of the data to form a detected correlation signal, forming a global average of said correlation signal, applying said global average of said correlation signal to one input of arithmetic means, forming a global average of the transformed data and applying the resultant to another input of said arithmetic means to form a detection signal.

2. A method as claimed in claim 1, wherein the step of scaling comprises scaling the watermark coefficients applied as the second input to the cross correlator.

3. A method as claimed in claim 1, wherein the step of scaling comprises scaling the transformed data applied as the first input to the cross correlator.

4. A method as claimed in claim 1, wherein the transformed data is applied to squaring means and averaged to form said local average characteristic.

5. A method as claimed in claim 1, wherein the scaling is performed by dividing the watermark coefficients by the local average characteristic.

6. A method as claimed in claim 1, wherein the detection signal is subjected to a thresholding operation.

7. A method as claimed in claim 1, wherein said arithmetic means comprises a square rooter and a divider.

8. Apparatus to detect the presence of a watermark in input digital data, the watermark including coefficients embedded in the input data, the apparatus comprising means to receive and spectrally transform the input data, a cross correlator having a first input to receive the transformed data and a second input to receive the watermark coefficients so as to form a cross-correlation signal, said cross-correlator including scaling means for scaling the transformed data by a local average characteristic of the data to form a detected correlation signal, means for forming a global average signal of said correlation signal and applying said global average signal to one input of arithmetic means, means for forming a global average of the transformed data and applying the resultant to another input of said arithmetic means whereby the output of the arithmetic means is a detection signal.

9. Apparatus as claimed in claim 8, wherein the scaling means is adapted to scale the cross correlation by scaling the watermark coefficients applied to the second input to the cross correlator.

10. Apparatus as claimed in 8, wherein the scaling means is adapted to scale the cross correlation by scaling the input data applied to the first input to the cross correlator.

11. Apparatus as claimed in claim 8, further comprising a squarer to receive the transformed data which is averaged to form said local average characteristic.

12. Apparatus as claimed in claim 8, wherein the scaling means comprise a scaling divider to divide the watermark coefficients by the local average characteristic.

13. Apparatus as claimed in claim 8, wherein the cross correlator comprises a multiplier to multiply the scaled watermark coefficients with the transformed input data.

14. Apparatus as claimed in claim 8, further comprising thresholding means to subject the detection signal to a threshold.

15. Apparatus as claimed in claim 8, wherein the arithmetic means comprises a square rooter and a divider.

16. Apparatus to detect the presence of a watermark including coefficients embedded in digital input data, said apparatus including:

means to receive and spectrally transform the input data to thereby form transformed data;

local averaging means for providing a local average of the power of the transformed data at first and second outputs thereof;

cross-correlation and scaling means connected to the first output of the local average means to scale the coefficients embedded in the input data and to cross-correlate the transformed data with the scaled coefficients to produce a correlation signal;

first global averaging means to form a global average of the correlation signal;

local average inverse means connected to the second output of the local average means so as to provide a local average inverse signal;

second global averaging means to form a global average of the local average inverse means; and arithmetic means to receive the global average of the correlation signal and the local average inverse signal so as to form a detection signal.

17. Apparatus as claimed in claim 16 wherein the transformed data is applied to a squarer connected to an input of the local average means.

18. Apparatus as claimed in claim 16 wherein the cross-correlation and scaling means includes a divider to divide the coefficients by the local average of the power of the transformed data.

19. Apparatus as claimed in claim 18 wherein the cross-correlation and scaling means further include a multiplier to multiply the scaled coefficients with the transformed data.

20. Apparatus as claimed in claim 16 wherein the arithmetic means comprises a square rooter and a divider.

21. Apparatus as claimed in claim 16 further comprising thresholding means to subject the detection signal to a threshold.

22. A method of detecting the presence of a watermark in digital data, said watermark including coefficients embedded in the data, the method comprising the steps of:

spectrally transforming the input data to form transformed data;

providing a local average of the power of the transformed data at first and second outputs of a local average means;

scaling the coefficients embedded in the data from the first output of the local average means and cross-correlating the transformed data with the scaled coefficients to thereby produce a correlation signal;

providing a local average inverse signal of the second output of the local average means;

forming a global average of the local average inverse signal;

receiving the global average of the correlation signal and the local average inverse signal to form a detection signal.

* * * * *